June 1, 1926.                                                    1,587,041
                          F. A. SECORD
                              KILN
                    Filed Sept. 22, 1922      2 Sheets-Sheet 1

Inventor:
Frederick A. Secord,
by Emery, Booth, Janney & Varney
Attys.

June 1, 1926. 1,587,041
F. A. SECORD
KILN
Filed Sept. 22, 1922 2 Sheets-Sheet 2
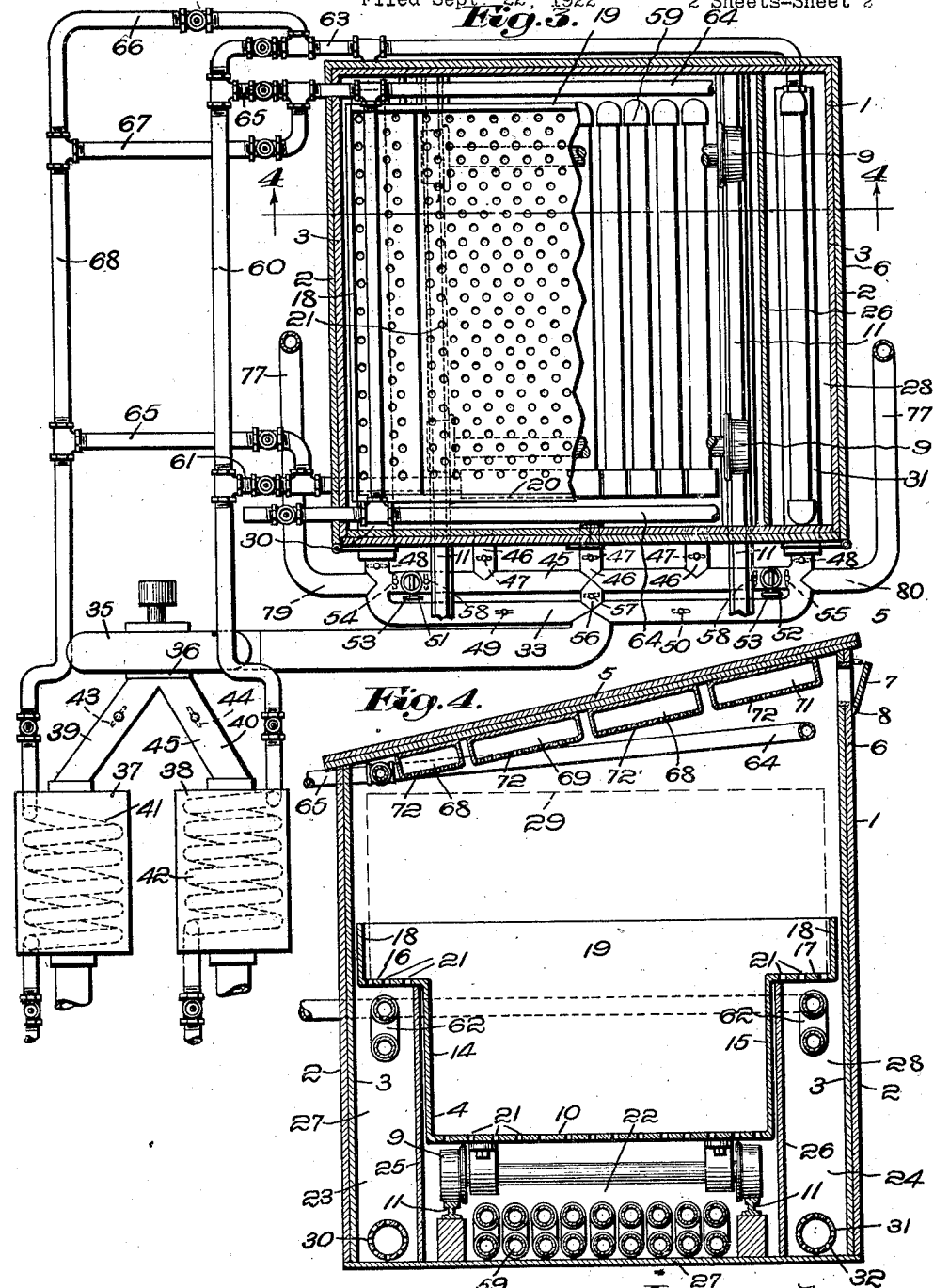

Patented June 1, 1926.

1,587,041

UNITED STATES PATENT OFFICE.

FREDERICK A. SECORD, OF PORTLAND, MAINE, ASSIGNOR OF ONE-THIRD TO CHARLES HENRY PETERS AND ONE-THIRD TO ALEXANDER PIERCE PATERSON, BOTH OF ST. JOHN, NEW BRUNSWICK, CANADA.

KILN.

Application filed September 22, 1922. Serial No. 589,862.

This invention relates to apparatus for drying materials. An object of the invention is to provide an apparatus for economically, rapidly and uniformly drying a mass of material thereby preventing the molding of portions of the material within or near the center of the mass.

The invention will be best understood by referring to the accompanying drawings which disclose, merely for illustrative purposes, one embodiment of an apparatus for carrying out the invention wherein:

Fig. 3 is a plan view of the apparatus with the top removed and certain other parts broken away to more clearly disclose the features therebeneath; and Fig. 4 is a vertical transverse section of the apparatus taken substantially on the line 4—4 of Fig. 3.

Figure 1:
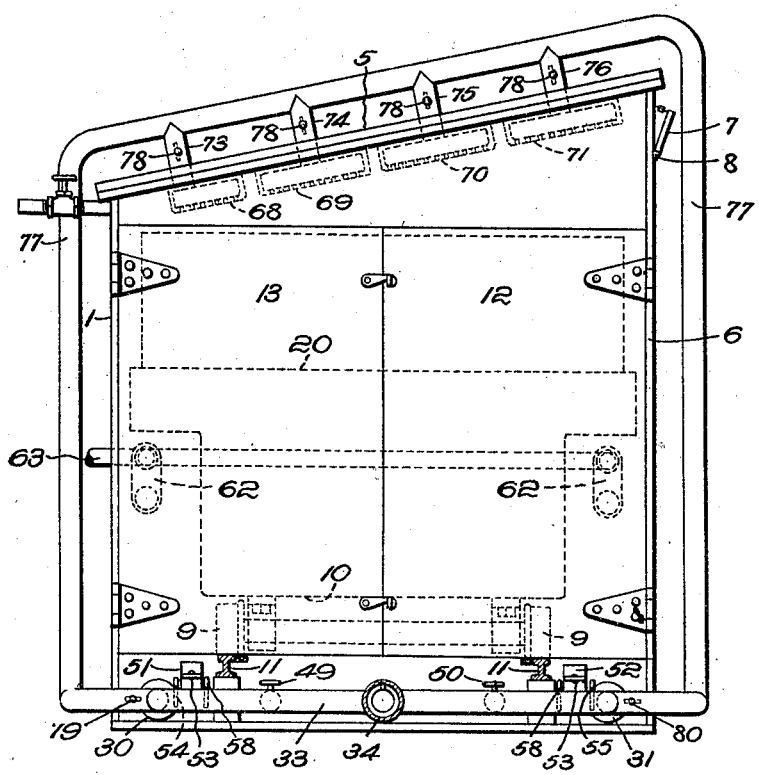
Fig. 1 is a front elevation of the apparatus.

In the drawings a casing 1 is provided which may be of any suitable form or construction. Herein said casing is of rectangular form and constructed with double walls consisting of two layers of material 2 and 3. The dimensions of the casing may obviously be varied to accord with the particular purpose for which it is to be used or with regard to capacity desired.

In the present example the casing is shown as of a size sufficient to receive a single carrier or car 4 upon which the material to be dried is piled and conveyed to and from the casing. The top of the casing is shown as consisting of a slanting roof 5 and near the peak thereof, herein in the front wall 6, a trap door 7 is arranged to regulate the discharge of heated air from the interior of the casing, said trap door being pivoted at 8 to swing about a horizontal axis arranged along the lower edge of the door. The carrier 4 is provided with trucks 9, 9 herein appropriately secured to and beneath the bottom 10 of the car, the wheels of said trucks being of the usual flanged type arranged to travel along tracks 11, 11 which enter said casing adjacent to an opening covered by swinging doors 12 and 13.

An important feature of the present invention has to do with the uniform drying of the entire mass of material upon the carrier 4, for the elimination of the molding of certain sections of the mass which molding is ordinarily due to an imperfect distribution or circulation of the drying medium or fluid throughout the mass. To this end the carrier 4 is provided with a bottom 10, sides 14 and 15 and projecting wings 16 and 17 extending laterally from the sides 14 and 15 respectively and at substantial distances above the bottom 10. The wings 16 and 17 constitutes shelves and have upwardly extending side portions 18. The ends 19 and 20 of the carrier are preferably straight without wings or shelves such as those shown at 16 and 17.

The bottom 10 and the wings 16 and 17 are preferably quite liberally perforated as indicated at 21 through which the drying or tempering fluids may be admitted to the mass of material supported upon said carrier.

Obviously various instrumentalities may be utilized for supplying the drying or tempering fluids through the perforations 21 to the casing and to the material upon the carrier but preferably the lower portion of the casing is divided into compartments herein a central compartment 22 and side compartments 23 and 24, this being effected, in the present example, by erecting two partitions 25 and 26, one at each side of the casing substantially parallel with the sides 14 and 15 of said carrier, said partitions extending upwardly substantially to the wings or shelves 16 and 17 of said car.

By providing the partitions 25 and 26 adjacent to the side walls, passages 27 and 28 will be formed whereby the drying or temperature fluids, as the case may be, may be directed to certain points in the mass of material indicated in outline by the dotted line 29, other than through the bottom of the mass, for example, said fluid will be directed through said passages 27 and 28 and through the perforations in the shelves 16 and 17 which overhang said partitions and that portion of the mass above said shelves or the fluid may be directed into the compartment 22 and thence upward through the perforations in the bottom 10 first to the portion of the mass lying below the level of the shelves 16 and 17.

The condition of the material that is to be dried largely determines the manner in which the drying fluid should be applied to the mass. In cases where the material is surcharged with moisture or frozen it is difficult to force the drying fluid through the mass from the bottom upward for invariably in such cases, a blanket of vapor will form part way up the mass and render it extremely difficult for the drying fluid to pass through or force its way upward and because of its tendency of seeking the lines of least resistance, said fluid will travel toward the sides of the mass rather than upward through its center. In such cases the outer layers of the mass will dry more rapidly than the interior and cause molding of the said interior portions.

At other times and under certain other conditions the heat will rise to the top of the casing and cause the upper strata of the mass to dry more rapidly than the lower strata thereof. Thus it will be obvious that the drying operations, in order to be most efficient, must be capable of being started at different parts or sections of the mass, or shifted from one region to another.

To this end, therefore, the passages 27 and the chamber 22 are provided with fluid supplying instrumentalities which are capable of forcing fluid into the casing at the points mentioned or said fluid-supplying means may, in part or severally, be employed to discharge fluid from the casing at said points.

Figure 2:
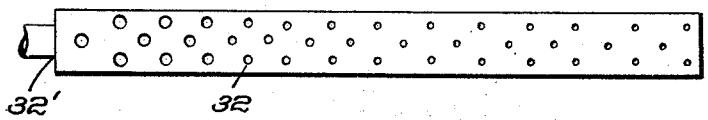
Fig. 2 is a detail plan view of one of the fluid distributing pipes.

The instrumentalities utilized in the present example for this purpose include pipes 30 and 31 arranged at the bottom of the compartments 23 and 24 respectively and having perforations 32 arranged to provide the proper supply of fluid to the compartment in proportion to the distance of the perforations from the fluid supply point thereof. Preferably said perforations 32 decrease in combined area from the supply ends 32' (as shown in Fig. 2) toward the opposite end thereby to effect uniform distribution of the fluid throughout said compartments. The pipes 30 and 31 have connections extending from the supply ends 32' thereof through the front wall of the casing where they are united by a header 33 to which fluid of the required temperature is supplied through a supply pipe 34 uniting with said header preferably substantially midway between the pipes 30 and 31. The pipe 34 is shown connected directly with a blower 35 herein of the centrifugal type which, in turn, receives its supply of fluid through a pipe 36 attached to the side of said blower.

It is desirable in order to secure the most efficient operation of the apparatus that the fluid admitted through the pipe 36 be varied in temperature from time to time—hence means are provided for accomplishing this result, which means herein consist of casings 37 and 38 connected respectively by means of pipes 39 and 40 with the fluid supply pipe 36 of the blower 35. Within the casing 37 I have provided a coil 41 of pipe through which a suitable cooling or freezing solution may be conveyed or circulated to lower the temperature of the fluid that is drawn through said casing 37 by the blower 35. The casing 38 on the other hand is provided with a coil 42 adapted to supply a heating medium thereto whereby the fluid that is being carried through said casing 38 by the blower 35 may be increased in temperature, said heating medium in the present example, consisting of steam. The pipes 39 and 40 are respectively provided with dampers 43 and 44 adapted for independent movement so that the exact proportion of hot and cold fluid may be supplied to the blower 35 thence to the casing.

Between the header 33 and the front wall of the casing is a cross pipe 45 having communication through a plurality of connecting pipes 46 with the compartment 22 of the casing 1. In each of said connecting pipes 46 is a damper 47 by means of which the supply of fluid to the compartment 22 through said pipes may be regulated or entirely shut off. The pipes 30 and 31 are likewise provided with dampers 48 and the header 33 has two dampers 49 and 50 arranged respectively upon opposite sides of the supply pipe 34. The cross pipe 45 has two discharge pipes 51 and 52 located respectively adjacent to the junction of said pipe 45 with the pipes 30 and 31, and these discharge pipes have dampers 53.

From the foregoing arrangement of pipes it will be obvious that by proper manipulation of the various dampers a supply of tempered fluid may be admitted to the casing either through the pipes 30 or through the pipe 31, or through both pipes 30 and 31, and, likewise, said fluid may be admitted at the same time to the compartment 22 through the cross pipe 45 and connecting pipes 46 or, if desired, said fluid may be admitted solely to the compartment 22 through one or all of the connecting pipes 46, it being assumed that the blower 35 has a capacity sufficient to supply fluid of the required temperature to all of the pipes referred to, and when this is being done, all of the dampers in the various pipes except the dampers 53 will be open. Should it be desired to supply drying fluid to one side only of the casing, as, for example, through the pipes 30, the dampers 49 of the header 33 and the damper 48 of the pipe 30 will be opened, while the damper 50 of the header 33 will be closed. The fluid thus supplied to the casing may be discharged therefrom through the trap 7 at the top of the casing or through the pipe 31 or through the connecting pipe 46, or said fluid may be discharged at all of said points. For example, if it is desired to discharge through the trap 7, the dampers 47 in the connecting pipes 46 will be closed, as will also the damper 48 in the pipe 31. This effects the passage of a current of fluid from the compartment 23 through the perforations 21 in the shelf 16 and upwardly through the mass of material above said shelf to the top of said casing.

If that portion of the material above the shelves 16 and 17 is first to be dried or dried independently of that portion of the mass below said shelves, the trap 7 and dampers 47 should be closed and the damper 48 in the pipes 31 opened, permitting the fluid to discharge through the pipes 52, the dampers 53 at this time being open. Obviously, a reversal of the current from the pipe 31 to the pipes 30 may be effected by the manipulation of the dampers 48, 49, and 50.

Where fluid is to be admitted to the casing through only one of the pipes 30 or 31, it will be necessary to provide, in addition to the dampers 49 and 50, dampers 54 and 55 which will prevent the shunting of the fluid from the pipe 30 across through the pipe 45 to the pipe 31, or vice versa.

Should it be desired to supply the fluid through both of the passages 27 and 28 and discharge it through the compartment 22, the dampers 49 and 50, together with the two dampers 48 of the pipes 30 and 31, must remain open, the dampers of all of the connecting pipes 46 or of one or more of said pipes, also the dampers 53 of discharge pipes 51 and 52 must be open and the dampers 54 and 55 closed. With the latter arrangement the mass of material upon the carrier 4 may be dried from the top down and the ill effects usually caused by the formation of blankets of vapor hereinbefore referred to will be entirely eliminated.

At other times when the likelihood of the formation of blankets of vapor is remote, it may be desirable to supply the drying fluid directly and only through the compartment 22, and to this end the header 33 is connected preferably near the center thereof by means of a pipe 56 with the cross pipe 45, and in this pipe 56 is a damper 57 which, at such times, will be open, although ordinarily it remains closed, and when said damper is opened the dampers 49 and 50 and the damper 53 should be open, but in order to prevent the escape of the fluid from the pipe 45 directly through the discharge pipes 51 and 52, dampers 58 are arranged between said pipe 56 and said discharge pipes 51 and 52, and during this operation the dampers will be closed.

The fluid admitted to the chamber 22 through the pipes 46, 45, 56 and 34 may be discharged from the casing at various points, for example, it may be discharged through the trap door 7 or through the pipe 30 and discharge pipe 51 or through the pipe 31 and discharge pipe 52 and again said fluid may be discharged from all of said points or from combinations of the same, thus if one part of the mass is drying more rapidly than another, that part may be cut out and the fluid directed to a section that is not drying as it should, substantially any combination being permissible with the arrangement of the pipes described.

There are occasions when it is desirable to additionally heat the currents of fluid entering the casing through the compartments 22, 23 and 24 and to this end means are provided consisting of a plurality of coils of pipe 59 arranged beneath the carrier 4 and connected with a main steam supply pipe 60 through a valve-controlled pipe 61. Also arranged near the upper end of each of the compartments 23 and 24 is a coil of pipe 62 connected by means of a valve controlled pipe 63 with the main steam supply pipe 60. Also at the top of the casing 4 another coil 64 of pipe is provided and this coil is likewise connected by a valve-controlled pipe 65 with the steam supply pipe 60, said coil 64 being often employed during the drying operation to increase the temperature of the moisture-laden air and thus assist in its discharge from the casing through the trap door 7.

Moisture always travels from hot to cold and therefore it is desirable to raise the temperature of the article or articles composing the mass of material within the casing to a predetermined degree and then surround such heated article with a somewhat lower tempered air or fluid to effect the drawing of the moisture from within the articles composing the mass to the surface of said articles whence it will be removed by properly tempered fluids circulating through the casing, said latter fluid being designated drying fluid while those which effect the drawing of the moisture from the interior of the article to the surface thereof have been designated as tempering fluids and from the foregoing description it will be obvious that drying and tempering fluids may be supplied to any of the distributing points in the casing that have been referred to although such fluids will not necessarily be supplied from the same point at the same time.

During the carrying out of the above operations wide variations in temperature are sometimes desired and often these variations, have to be made quickly and from the foregoing it will be seen that such quick changes are possible merely by opening and closing the proper dampers or valves in the various supply pipes. Furthermore in addition to increasing the temperature of the fluid at various points it is desirable locally to decrease the temperature of certain of said fluids rather than to decrease the temperature of the whole and to this end means are provided for admitting cooling fluids independently through the various coils 59, 62 and 64, said means consisting of valve-controlled pipes 65, 66 and 67 which connect a main brine supply pipe 68 respectively with the valve-controlled pipes 61, 63 and 65 hereinbefore described.

In the furtherance of the plan to provide means to direct the heating, tempering or drying fluids to any part of the casing, I have provided at the top thereof a series of ducts herein four in number and designated 68, 69, 70 and 71 each of which is perforated at 72 preferably upon its under side.

The ducts 68, 69, 70 and 71 have communication respectively through pipes 73, 74, 75 and 76 with a fluid pipe 77 extended herein from the pipe 30 at one side of the casing over the same to the opposite side thereof where it connects with the pipe 31. A damper 78 is placed in each of the pipes 73, 74, 75 and 76 and dampers 79 and 80 are provided in the pipe 77 near where it connects with the pipes 30 and 31.

By proper manipulation of the various dampers it will be obvious that the ducts 68, 69, 70 and 71 may be used severally or jointly either to supply tempered fluid to the casing or its action may be reversed to draw or force fluid from said casing.

From the foregoing it will thus be obvious that drying or tempering fluid may be admitted at practically any desirable section in the mass; that is at the bottom, sides or top, or in such combinations of said sections as may be desired and furthermore the moisture-laden material or so-called drying fluid may be discharged from said casing either at the top, sides, bottom or any one of them or in any combination desired so that, regardless of the condition of the material, a predetermined section or sections may be dried in the order desired.

While I have herein disclosed and discussed in detail the construction and arrangement of parts incidental to such disclosure, it is to be distinctly understood that the invention is limited neither to the mere details nor to the relative arrangement of parts herein described but that substantial deviations may be made therefrom without departing from the scope of the invention as defined in the appended claims.

Claims:

1. In a drying apparatus, a carrier for the material to be dried and means to direct tempered fluid in a plurality of directions to predetermined sections of said carrier.

2. In a drying apparatus, a carrier for the material to be dried and means to supply drying fluid in a plurality of predetermined directions through selected portions of the material carried by said carrier.

3. In a drying apparatus, a carrier for the material to be dried and means to supply tempering fluid in a plurality of predetermined directions to selected portions of the material upon said carrier.

4. In a drying apparatus, a carrier to support the material to be dried and means to supply drying and tempering fluids in a plurality of predetermined directions to selected portions of the material on said carrier.

5. A drying apparatus comprising, in combination, a casing, a plurality of partitions arranged parallel with the side walls of said casing, means to supply tempered fluid to said casing on either side of each of said partitions, a carrier arranged for movement into said casing, said carrier having a body with parts overhanging said partitions, and means including apertures in said overhanging parts and in the bottom of said body to admit tempered fluid to selected parts of the material upon said carrier.

6. A drying apparatus comprising, in combination, a casing, a carrier to convey material to and from said casing, a body for said carrier having apertures in the bottom and through portions of the sides thereof, and means to supply tempered fluid to the material on said carrier through said apertures.

7. A drying apparatus comprising, in combination, a casing, a carrier to convey material to and from said casing, a body for said carrier having bottom and side walls and lateral wing portions in said side walls, said bottom and the under portion of said wings having apertures, and means to supply tempered fluid to the material on said carrier through said body apertures and discharge said fluid at the top thereof.

8. A drying apparatus comprising, in combination, a casing, a carrier to convey material to and from said casing, a body for said carrier having apertures in the bottom and portions of the sides thereof, and means to supply tempered fluid to the material on said carrier through said apartures and discharge said fluid through the apertures at the bottom thereof.

9. A drying apparatus comprising, in combination, a casing having a discharge opening at the top, means to support material in said casing, and externally controlled means to supply tempered fluid to one or both sides of said mass and discharge it at the top of said mass.

10. A drying apparatus having a casing, carrier means to support material in said casing, and externally controlled means to supply tempered fluid to one or both sides of said material and discharge it at the bottom of said casing.

11. A drying apparatus having a casing, carrier means to support a mass of material in said casing, and externally controlled means to supply tempered fluid to one or both sides of said mass and discharge it at the top and bottom of said casing.

12. A drying apparatus having a casing, carrier means to support material in said casing, and means to supply tempered fluid to said material at the bottom thereof and discharge it at one or both sides thereof.

13. A drying apparatus having a casing, carrier means to convey a mass of material to said casing, means to supply tempered fluid at the sides or bottom or to both sides and bottom of said mass of material and means to discharge said fluid at the top of said casing.

14. A drying apparatus having a casing, carrier means to convey a mass of material to said casing, means to supply tempered fluid through selected sections of said mass, and means to additionally heat said fluid immediately preceding its contact with said material.

15. A drying apparatus having a casing, carrier means to convey a mass of material to and from said casing, means to supply tempered fluid through selected sections of said mass, and means to reduce the temperature of said fluid at selected points preceding its contact with said material.

16. In a drying apparatus, carrier means for conveying a mass of material, and means to direct tempered fluid through selected sections of the mass of material on said carrier.

17. In a drying apparatus, carrier means for the material, means to supply fluid to selected parts of said carrier to increase the temperature of the material to a given point, and means to supply fluid of a relatively lower temperature to said selected parts of said carrier to effect the drawing of the moisture to the surface of said material.

18. In a drying apparatus, carrier means for the material, means to supply fluid in a plurality of directions to selected parts of said carrier to increase the temperature of the material to a given point, and means to supply fluid of a relatively lower temperature to the same or other selected parts of said carrier to lower the temperature surrounding said material and effect the withdrawal of the moisture from said material.

19. A drying apparatus having a casing, means to supply fluid to selected parts and at selected angles through said casing and means to discharge the drying fluid at the bottom of said casing.

20. A drying apparatus having a casing, means to supply tempered fluid to selected parts of said casing, and means to discharge said fluid at the bottom of said casing.

21. In a drying apparatus, a casing, a plurality of fluid compartments surrounding and for supplying fluid to said casing, and means to regulate the distribution of fluid in said compartments.

22. In a drying apparatus, a casing, fluid compartments disposed at opposite sides of said casing and means including perforated pipes extending longitudinally of said compartments, the perforations in said pipes decreasing in area from the intake points thereof to provide a uniform distribution of fluid in said compartments.

23. In a drying apparatus, a casing having at least one fluid distributing compartment, and means to supply tempered fluid to said compartment including a pipe having perforations decreasing in area from the intake end thereof toward the opposite end for the purpose of effecting a uniform distribution of fluid throughout said chamber.

24. In a drying apparatus, a casing and a chamber for supplying tempered drying fluid to said casing, said chamber having perforations varying in area according to their distance from the fluid supplying end of said pipe.

25. A drying apparatus comprising a casing for the material to be dried and means for supplying fluid to or withdrawing fluid from all sides of said casing.

26. A drying apparatus comprising a casing for the material to be dried and means for supplying fluid to or withdrawing fluid from any section of the mass of material contained in said casing.

27. A drying apparatus comprising a casing for the material to be dried and a plurality of fluid supplying means arranged adjacent several walls of said casing to effect the drying of selected parts of the mass of material and at varying angles with respect to a vertical plane.

In testimony whereof, I have signed my name to this specification.

FREDERICK A. SECORD.

Certificate of Correction.

It is hereby certified that in Letters Patent No. 1,587,041, granted June 1, 1926, upon the application of Frederick A. Secord, of Portland, Maine, for an improvement in "Kilns," errors appear in the printed specification requiring correction as follows: Page 1, line 65, for the word "constitutes" read *constitute*, and line 93, for the word "temperature" read *tempering;* page 3, line 55, for the word "damper" read *dampers*, and line 60, for the article "the" read *these;* same page, line 125, strike out the comma; and that the said Letters Patent should be read with these corrections therein that the same may conform to the record of the case in the Patent Office.

Signed and sealed this 13th day of July, A. D. 1926.

[SEAL.]

M. J. MOORE,
*Acting Commissioner of Patents.*